United States Patent
Minagawa et al.

(10) Patent No.: US 6,293,327 B1
(45) Date of Patent: *Sep. 25, 2001

(54) PNEUMATIC TIRE

(75) Inventors: Yasuhisa Minagawa, Akashi; Kiyoshige Muraoka; Yutaka Kuroda, both of Kobe, all of (JP)

(73) Assignee: Sumitomo Rubber Industries, Ltd., Kobe (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/099,347

(22) Filed: Jun. 18, 1998

(30) Foreign Application Priority Data

Jun. 20, 1997 (JP) ...................................... 9-164592
Jan. 13, 1998 (JP) ...................................... 10-004907

(51) Int. Cl.⁷ ..................................... B60C 5/12
(52) U.S. Cl. ......................... 152/564; 152/548; 152/552
(58) Field of Search ................... 152/564, 548, 152/510, 552, 549, 565

(56) References Cited

U.S. PATENT DOCUMENTS

| | | | |
|---|---|---|---|
| 4,279,284 | * 7/1981 | Spadone | 152/510 |
| 5,484,005 | * 1/1996 | Morehart et al. | 152/564 |
| 5,580,513 | 12/1996 | Patitsas et al. | |
| 5,688,343 | * 11/1997 | Minami et al. | 152/510 |
| 5,879,485 | * 3/1999 | Sakamoto et al. | 152/548 |

FOREIGN PATENT DOCUMENTS

| | | | |
|---|---|---|---|
| 0475733A | 3/1992 | (EP) . | |
| 0604834A | 7/1994 | (EP) . | |
| 0705717A | 4/1996 | (EP) . | |
| 0711642A | 5/1996 | (EP) . | |
| 6-156007 | * 6/1994 | (JP) | 152/564 |
| 8-157648 | * 6/1996 | (JP) | 152/564 |
| WO 9201744A | 2/1992 | (WO) . | |

OTHER PUBLICATIONS

English Abstract for JP 08–157,648, Patent Abstracts of Japan, Jun. 18, 1996.

* cited by examiner

Primary Examiner—Geoffrey L. Knable
(74) Attorney, Agent, or Firm—Birch, Stewart, Kolasch & Birch, LLP (57) ABSTRACT

A pneumatic tubeless tire without an innerliner having a topping rubber layer which includes aligned casecords therein; a rubber composition for the topping rubber layer containing no plasticizer and comprising 100 parts by weight of a rubber component consisting essentially of 50 to 90% by weight of a diene rubber and 50 to 10% by weight of a brominated isobutylene/p-methylstyrene copolymer, and 1 to 10 parts by weight of a tackifier. According to the present invention, there is a durable and lightweight pneumatic tubeless tire without an innerliner in which the topping rubber layer has superior adhesion properties to the embedded casecords and other tire members containing diene rubber.

4 Claims, 5 Drawing Sheets

PNEUMATIC TIRE

TECHNICAL FIELD

The present invention relates to a pneumatic tubeless tire without an innerliner. Further, the present invention relates to a pneumatic tubeless tire without an innerliner particularly with superior durability of its bead portion.

BACKGROUND

Figure 4:
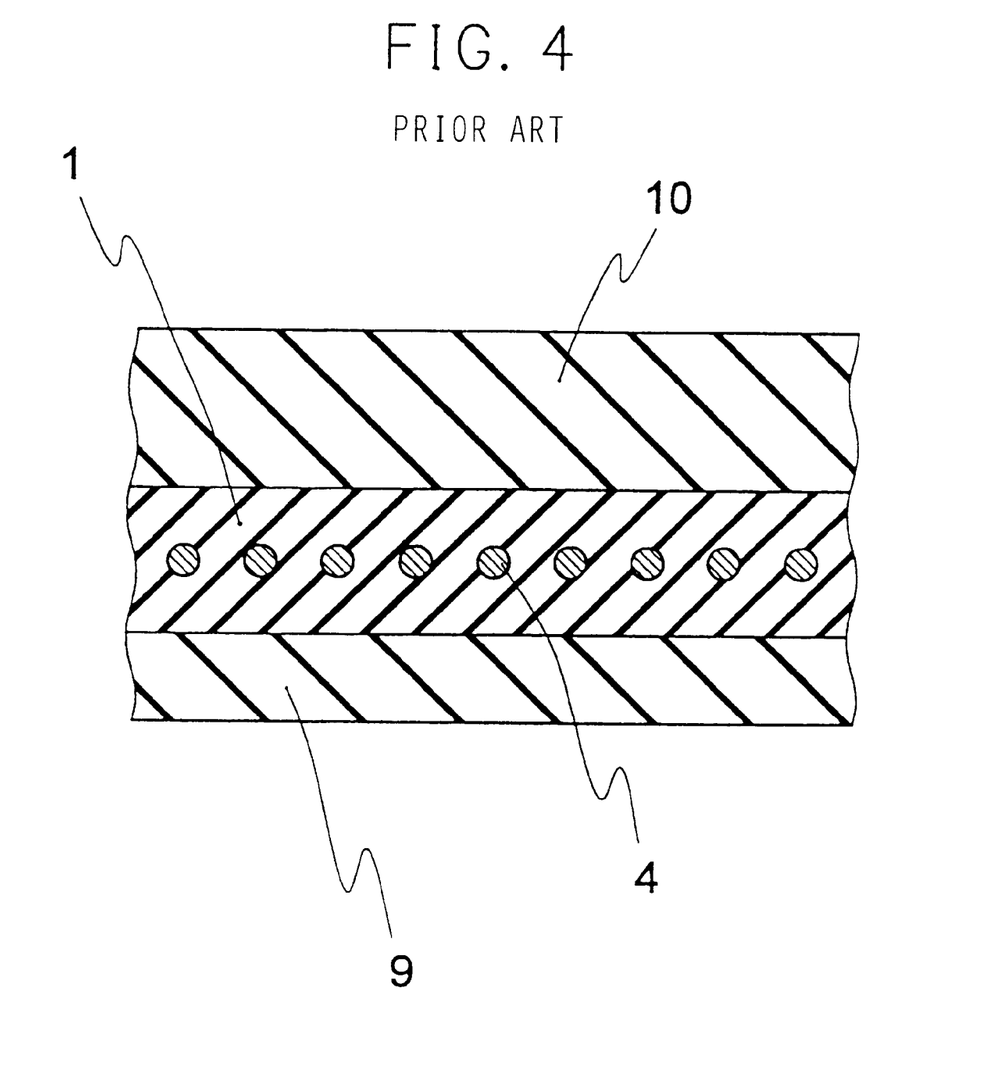
FIG. 4 is a schematic cross-sectional view of a topping rubber layer in a conventional pneumatic tubeless tire.

Hitherto, with respect to a pneumatic tubeless tire, a low air permeable rubber such as butyl rubber has been employed for an innerliner to maintain air pressure of the tire. FIG. 4 is a cross-sectional view of around a topping rubber layer for casecords of a conventional typical pneumatic tire. In FIG. 4, numeral 1 represents a topping rubber layer wherein casecords 4 are arranged usually in a line. On the portion inside from the casecord 4, there is an innerliner 9 comprising butyl rubber or the like for maintaining air pressure of the tire, and on the portion outside from the the casecord 4, there is provided a sidewall layer 10. The innerliner occupies about 10% by weight of tire members constituting the tire and prevents the weight of the tire from decreasing.

On the other hand, in view of necessity for low fuel consumption, a lightweight tire is required and simplicity in the tire producing processes is also required. And, it is proposed that the topping rubber layer 1 is made of a rubber composition obtained by blending low air permeable butyl rubber and brominated isobutyl/p-methylstyrene copolymer and to leave out the innerliner 9 (refer to JP-A-55665/1994, JP-A-156007/1994 and JP-A-157648/1996).

Since a highly saturated rubber such as butyl rubber or the like is inferior in adhesion property to a diene rubber which is highly unsaturated rubber, adhesion between the topping rubber layer and other tire members such as the sidewall which contains a diene rubber as a main component is inferior and adhesion to casecords is also inferior, so that the tire to be obtained has a problem in its durability.

For example, in JP-A-157648/1996, there is disclosed, for balancing adhesion properties to casecords and low air permeability, that brominated isomonoolefin/p-alkylstyrene copolymer as a highly saturated rubber is employed for a rubber composition constituting the topping rubber layer.

To obtain such an effect, however, a blending amount of the above-mentioned copolymer must be not less than 50 parts by weight in practice and, therefore, there is a problem that adhesion to other tire members containing a diene rubber as a main component is inferior.

On the other hand, from the viewpoint of further improving durability of tire, for example, in JP-A-113007/1996 and JP-A-157648/1996, there is disclosed that a thickness of a carcass is adjusted to the specific thickness for improving durability of the rolled-up end portion around a bead portion. When the thickness of carcass itself is increased, however, the weight of the whole tire is also increased as a result.

Further, in conventional tires, since an amine antioxidant is used in general, there is a problem that resistance to flexing fatigue of the rubber composition is lowered with lapse of time.

As described above, any lightweight pneumatic tubeless tire without an innerliner having a topping rubber layer, which has a low air permeability and sufficient adhesion to both of the other tire members containing a diene rubber as a main component and casecords, has not been obtained.

An object of the present invention is to provide a lightweight pneumatic tubeless tire without an innerliner in which adhesion properties of the topping rubber layer to casecords and other tire members containing a diene rubber as a main component and durability are both excellent.

Another object of the present invention is to provide a pneumatic tire without an innerliner having a particularly excellent durability around its bead portion.

SUMMARY OF THE INVENTION

The present invention relates to an improvement of a pneumatic tubeless tire having no innerliner and having a topping rubber layer which includes aligned casecords therein; the improvement comprising that a rubber composition for the topping rubber layer contains no plasticizer and comprises 100 parts (part by weight, hereinafter the same) of a rubber component consisting essentially of 50 to 90% (% by weight, hereinafter the same) of a diene rubber and 50 to 10% of brominated isobutylene/p-methylstyrene copolymer, and 1 to 10 parts of a tackifier.

Further, the present invention relates to an improvement of a pneumatic tubeless tire having no innerliner and having a topping rubber layer which includes aligned casecords therein; the improvement comprising that the topping rubber layer comprises an inner rubber layer provided on the inside from the aligned casecords and an outer rubber layer provided on the outside from the aligned casecords, and that a rubber composition for the inner rubber layer contains no plasticizer and comprises 100 parts of a rubber component consisting essentially of 50 to 90% of a diene rubber and 50 to 10% of brominated isobutylene/p-methylstyrene copolymer and 1 to 10 parts of a tackifier.

Further, the present invention relates to an improvement of a pneumatic tubeless tire having no innerliner and having a topping rubber layer which includes aligned casecords, wherein an end portion of said topping rubber layer is rolled up around a bead portion and the rolled-up topping rubber layer is overlapped with the remaining topping rubber layer; the improvement comprising, that a rubber composition for the topping rubber layer contains an amine-ketone antioxidant but contains no plasticizer and comprises 100 parts of a rubber component consisting essentially of 50 to 90% of a diene rubber and 50 to 10% of a halogenated butyl rubber or brominated isobutylene/p-methylstyrene copolymer and 1 to 10 parts of a tackifier, and that, after vulcanization, a minimum distance between the aligned casecords in the remaining topping rubber layer and the aligned casecords in the rolled-up topping rubber layer is not less than 0.1 mm.

In that case, preferably, the topping rubber layer comprises an inner rubber layer on the inside from the aligned casecords and an outer rubber layer provided on the outside from the aligned casecords, and the inside rubber layer contains an amine-ketone antioxidant but contains no plasticizer and comprises 100 parts of a rubber component consisting essentially of 50 to 90% of a diene rubber and 50 to 10% of a halogenated butyl rubber or brominated isobutylene/p-methylstyrene copolymer and 1 to 10 parts of a tackifier.

DETAILED DESCRIPTION

Embodiment 1 according to the present invention has no innerliner as shown in FIG. 4 and is characterized in that a rubber composition for the topping rubber layer (hereinafter, referred to as "rubber composition A") comprises 100 parts of a rubber component consisting essentially of 50 to 90% of a diene rubber and 50 to 10% of brominated isobutylene/p-methylstyrene copolymer and 1 to 10 parts of a tackifier, but does not contain a plasticizer.

Usually in a rubber composition for a tire, for improving proccessability, tackiness, flexibility and the like, plasticizers such as a mineral softening agent such as mineral oil or aromatic oil, a vegetable softening agent, and a derivative of futaric acid are admixed. There is a problem, however, that as an amount of the plasticizer is increased, adhesion properties of the rubber composition to other tire members containing a diene rubber as a main component and the casecord becomes inferior. According to the present invention, no plasticizer is not used in the rubber composition A.

Further, the inventors have found that the rubber composition A has a low air permeability due to brominated isobutylene/p-methylstyrene copolymer and it maintains good proccessability without plasticizer because of blending a specific amount of the tackifier, and also is superior in adhesion to casecords and other tire members containing a diene rubber such as a sidewall(SW) layer.

The diene rubber of the rubber composition A according to the present invention may be any one used in the field of a conventional tire particularly for rubber compositions for a topping rubber layer. There are, for example, natural rubber(NR), styrene butadiene rubber(SBR), butadiene rubber(BR), isoprene rubber(IR), chloroprene rubber(CR), acrylonitrile butadiene rubber(NBR) and the like. The diene rubber may be used alone or in an optional combination of two or more. From the viewpoint of improving strength of a cured rubber composition, it is preferable to employ NR as a main diene rubber.

The rubber composition A according to the present invention contains a brominated isobutylene/p-methylstyrene copolymer to give low air permeability. In conventional tires, butyl rubbers such as brominated butyl rubber which are highly saturated have been employed to give low air permeability. Though such butyl rubbers have approximately the same low air permeability as the above-mentioned brominated copolymer, it is difficult to adhere the butyl rubber to the diene rubber and casecords sufficiently.

The brominated isobutylene/p-methylstyrene copolymer is not particularly limited and, from the viewpoint of an adhesion property, a desirable isobutylene content thereof is 89 to 97%, preferably 89 to 95%, further preferably 89 to 93%.

Examples of commercially available brominated isobutylene/p-methylstyrene copolymers usable in the present invention are, for instance, EXXPRO 90-10, EXXPRO 89-4 and EXXPRO 93-5 available from EXXON CHEMICAL COMPANY and the like.

A blending ratio of the rubbers in the rubber component of the rubber composition A according to the present invention is preferably 50 to 90% of the diene rubber and 50 to 10% of the brominated isobutylene/p-methylstyrene, from the viewpoint of balance between low air permeability and adhesion to other tire members containing a diene rubber and casecords, and more preferably 70 to 90% of the diene rubber and 30 to 10% of the brominated isobutylene/p-methylstyrene from the viewpoints of improving adhesion to other tire members containing a diene rubber and casecords and improving durability of tire, and, most preferably 71 to 80% of the diene rubber and 29 to 20% of the brominated isobutylene/p-methylstyrene, from the viewpoint of balance between decrease in weight of the tire and low air permeability.

Further in the present invention, the rubber composition A contains a tackifier for improving adhesion to other tire members containing a diene rubber and casecords, improving tackiness and proccessability in the tire molding process steps and giving good low air permeability.

The tackifier may be one employed in the field of conventional tire. There are, for example, coumarone resin, phenol resin, terpene resin, petroleum hydrocarbon resin, resin derivative and the like. The tackifier may be used alone or in an optional combination of two or more. From the viewpoint of good tackiness, phenol resin, terpene resin and petroleum hydrocarbon resin are preferably employed and, from an economical point of view, petroleum hydrocarbon resin is more preferable.

Examples of commercially available tackifiers usable in the present invention are, for instance, Marucalets T100A (petroleum hydrocarbon resin) available from Mruzen Petrochemical Co., Ltd., Escolets 1102 (petroleum hydrocarbon resin) available from EXXON CHEMICAL COMPANY and the like.

A blending ratio of the tackifier per 100 parts of the above-mentioned rubber component may be 1 to 10 parts, preferably 3 to 10 parts from the viewpoint of tackiness, more preferably 3 to 8 parts from. the viewpoint of adhesion property.

In addition, other than the rubber component and the tackifier, additives may be added optionally to the rubber composition A for example, fillers such as carbon black and silica, vulcanizing agents such as sulfur, vulcanization assistants such as stearic acid and zinc white, accelerators such as N-tert-butyl-benzothiazolylsulfenamide(NS) and dibenzothiazyl disulfide(DM), and other acids, such as alkylphenol disulfide, 2,5-dimercapto-1,3,4-thiaziazol and 2-di-n-butylamino-4,6-dimercapto-S-triazine in such an amount that low air permeability and adhesion to other tire members and casecord are not decreased.

Particularly, when carbon black is blended, HAF grade carbon black may be blended in an amount of not more than 65 parts per 100 parts of the rubber component from the viewpoint that hardness of the cured rubber composition is not increased too much, preferably in an amount of 35 to 65 parts per 100 parts of the rubber component from the viewpoint of improving low air permeability.

The casecords which are included and embedded in the topping rubber layer may be ones employed in the field of conventional tires. There are, for example, organic fibers such as rayon, nyron, polyester and Kevler, glass fiber, steel wire and the like. Organic fiber is preferable from the viewpoints of good adhesion to the rubber composition A, durability and decrease in weight of tire and, among them, polyester fiber is more preferable.

The topping rubber layer can be produced by embedding the casecords in a line with the rubber composition A according to conventional methods. For example, the topping rubber layer can be given by putting in alignment the casecords between two rubber sheets prepared from the rubber composition A, followed by extruding (topping) through rolls. With respect to other processes, the tubeless tire without an innerliner of the present invention can be produced through conventional manners and conditions.

The other tire members containing a diene rubber as a main component are, for example, a sidewall portion, tread portion, belt and the like.

The rubber component of the other tire members containing a diene rubber as a main component may be one used conventionally and is not particularly limited. Examples are, for instance, diene rubbers such as NR, SBR, and BR Also, EPDM, butyl rubber and the like may be contained.

According to an Embodiment 1 the topping rubber layer can be endowed with a sufficient low air permeability and good adhesion to other tire members containing a diene rubber such as tread rubber and sidewall and casecords. Accordingly, a lightweight pneumatic tubeless tire without an innerliner having good durability can be provided.

Embodiment 2 of the present invention is explained hereinbelow.

Usually, the topping rubber layer is produced, as explained above, by putting the casecords between two rubber sheets which comprise the rubber composition constituting the topping rubber layer, and extruding them through rolls. Therefore, as shown in the cross-sectional view of FIG. 1, it is regarded that the topping rubber layer comprises the aligned casecords 4, the inner topping rubber layer (hereinafter referred to as "inner rubber layer") 2 on the inside from the aligned casecords and the outer topping rubber layer (hereinafter referred to as "outer rubber layer") 3 on the outside from the aligned casecords.

Accordingly Embodiment 2 is a pneumatic tubeless tire without an innerliner wherein the inner rubber layer comprises the above-mentioned rubber composition A.

Figure 1:
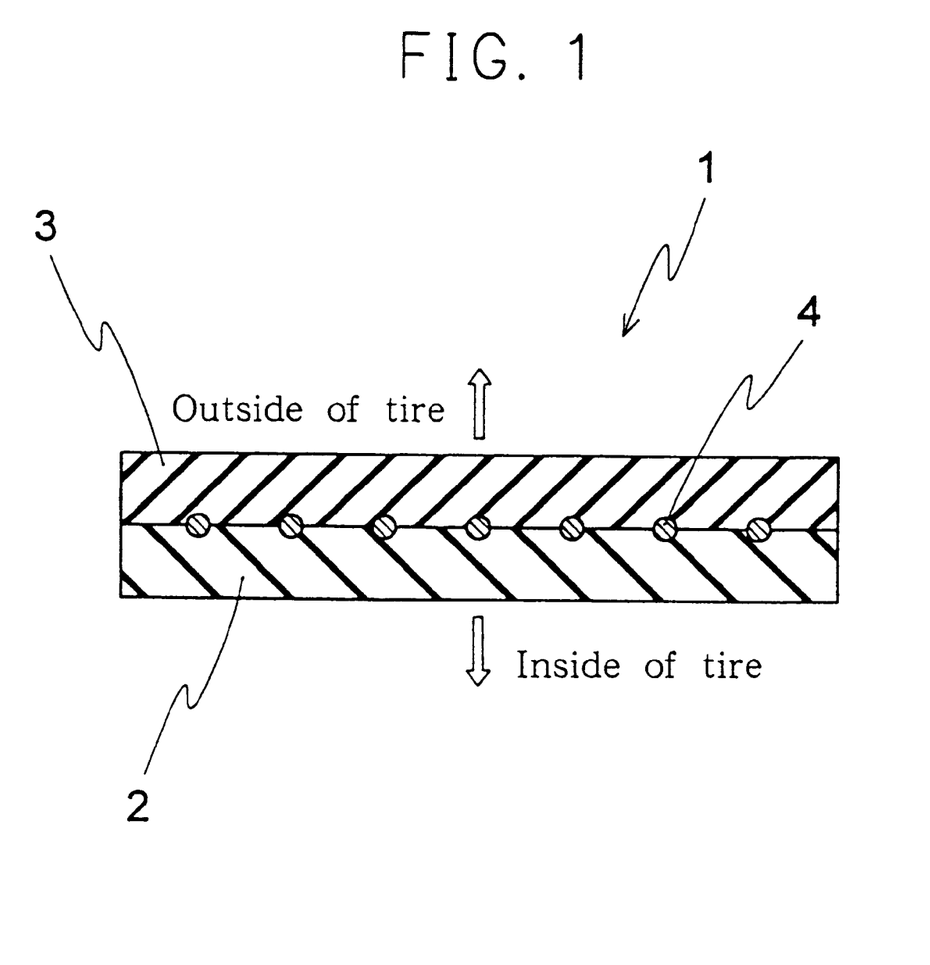
FIG. 1 is a schematic cross-sectional view of the topping rubber layer in Embodiments 2 and 4.

In other words, in the two-layered topping rubber layer shown in FIG. 1, Embodiment 2 is the same as Embodiment 1 except that the rubber composition A is employed for the inner rubber layer to give good low air permeability and adhesion to casecords and that the following rubber composition B is employed for the outer rubber layer.

In that case, a rubber composition which constitutes the outer rubber layer (hereinafter referred to as "rubber composition B") has good adhesion to the above-mentioned rubber composition A of the inner rubber layer, and also to the casecords and other tire members (for example, sidewall portion) containing a diene rubber as a main component.

Therefore, the rubber composition B may have the same components as the rubber composition A and may contain a smaller amount of brominated isobutylene p-methylstyrene than the rubber composition A.

The rubber composition B may also be the same as a conventional topping rubber composition for the casecords, comprising a diene rubber, because good adhesion to the inner rubber layer, casecords and other tire members containing a diene rubber as a main component can be obtained and the inner rubber layer has a role of low air permeability. The rubber composition B preferably comprises a rubber component of NR and SBR, a carbon black and a plasticizer and, further, may contain a vulcanizing agent such as sulfur, a vulcanization assistant such as stearic acid or zinc oxide, an accelerator and the like.

Figure 2:
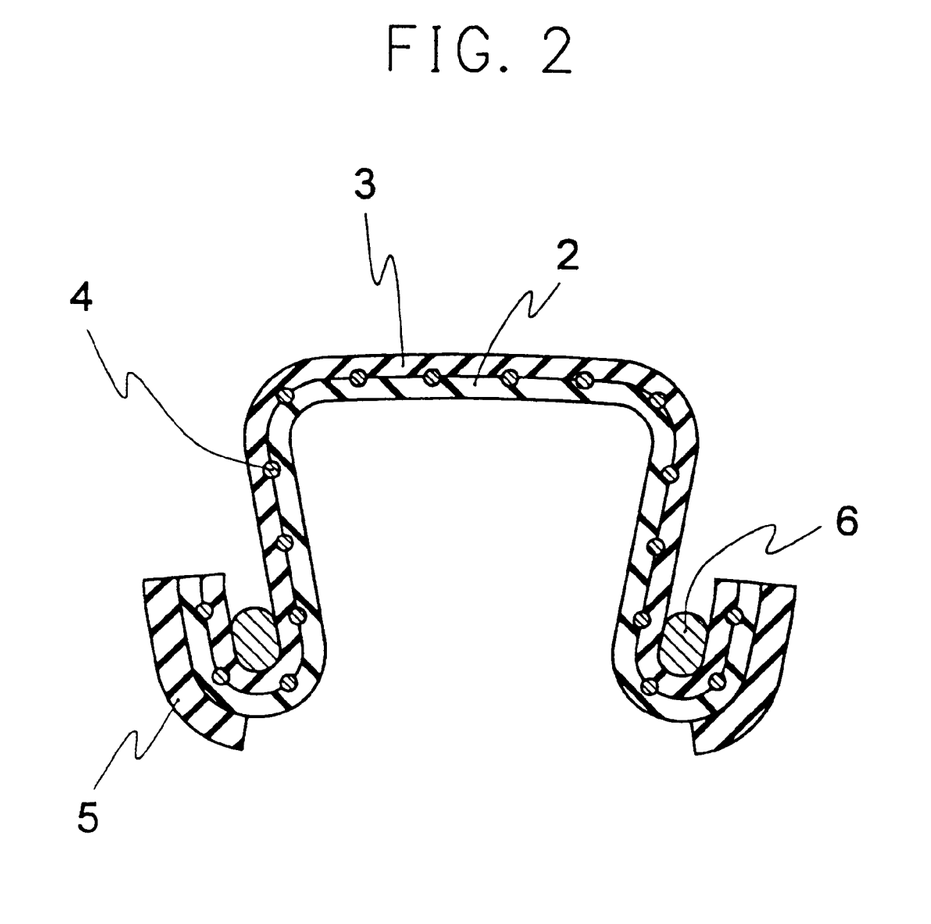
FIG. 2 is a schematic cross-sectional view of an embodiment of the topping rubber layer (carcass) and the bead portion in Embodiments 2 and 4.

As shown in FIG. 2 an end portion of the topping rubber layer the aligned casecords 4 are rolled up around a bead portion 6 and the rolled-up portion of the topping rubber layer is overlapped with the main portion of the topping rubber layer. In that case the topping rubber layer of Embodiment 2 is used to produce a tire, a special rubber layer 5 (outside rubber layer over bead portion) may be provided on the outside of the rolled-up portion. The special rubber layer 5 may have the same components as the outer rubber layer.

According to Embodiment 2, the inner rubber layer can be endowed with good low air permeability and, thereby, a lightweight pneumatic tubeless tire without innerliner having good durability can be obtained.

Embodiment 3 of the present invention is explained in the following.

Embodiment 3 is basically the same as Embodiment 2, but different, such as, the rubber composition for the topping rubber layer contains further an amine-ketone antioxidant, that the brominated isobutylene/p-methylstyrene copolymer may be replaced by a halogenated butyl rubber, and that, after vulcanization, a minimum distance between the aligned casecords in the remaining topping rubber layer and the aligned casecords in the rolled-up topping rubber layer is not less than 0.1 mm.

Namely, Embodiment 3 relates to an improvement of a pneumatic tubeless tire having no innerliner and having the topping rubber layer which includes the aligned casecords, wherein the end portion of the topping rubber layer is rolled up around the bead portion and the rolled-up topping rubber layer is overlapped with the remaining topping rubber layer; the improvement comprising, that a rubber composition for the topping rubber layer contains no plasticizer and comprises 100 parts of a rubber component consisting essentially of 50 to 90% of a diene rubber and 50 to 10% of a halogenated butyl rubber or brominated isobutylene/p-methylstyrene copolymer and 1 to 10 parts of a tackifier, and contains an amine-ketone antioxidant, and that, after vulcanization, a minimum distance between the aligned casecords in the remaining topping rubber layer and the aligned casecords in the rolled-up topping rubber layer is not less than 0.1 mm.

Hereinafter, the rubber composition for the topping rubber layer in Embodiment 3 is referred to as "rubber composition C".

The rubber composition C may contain a halogenated butyl rubber instead of the brominated isobutylene/p-methylstyrene copolymer because adhesion to casecords is improved by admixing the amine-ketone antioxidant, nevertheless the reason is not confirmed.

According to Embodiment 3, the amine-ketone antioxidant is used as an antioxidant to prevent decrease in resistance to flexing fatigue of the rubber composition C of the topping rubber layer (carcass) with lapse of time. It is presumed that such an effect can be obtained because the amine-ketone antioxidant initially gives good resistance to flexing fatigue and, differently from other amine antioxidants, does not have the tendency to undesirably cure the brominated isobutylene/p-methyestyrene copolymer with lapse of time. As the amine-ketone antioxidant, there are, for example, 6-ethoxy-1,2-dihydroxy-2,2,4-trimethylquinoline, reaction product of diphenylamine and acetone, reaction product of aniline and acetone, polymer of 2,2,4-trimethyl-1,2-dihydroxyqunoline and the like. Among them, 6-ethoxy-1,2-dihydroxy-2,2,4-trimethylquinoline, reaction product of aniline and acetone, polymer of 2,2,4-trimethyl-1,2-dihydroxyqunoline is more preferable from the viewpoint of good resistance to flexing fatigue.

An amount of the amine-ketone antioxidant in the rubber composition C may be selected within the range where the effects of the present invention are not lowered and is preferably not less than 0.5 parts from the viewpoint that resistance to bending fatigue is improved, and not more than 10 parts per 100 parts of the rubber component from the viewpoint of not so rapid vulcanization.

Figure 5:
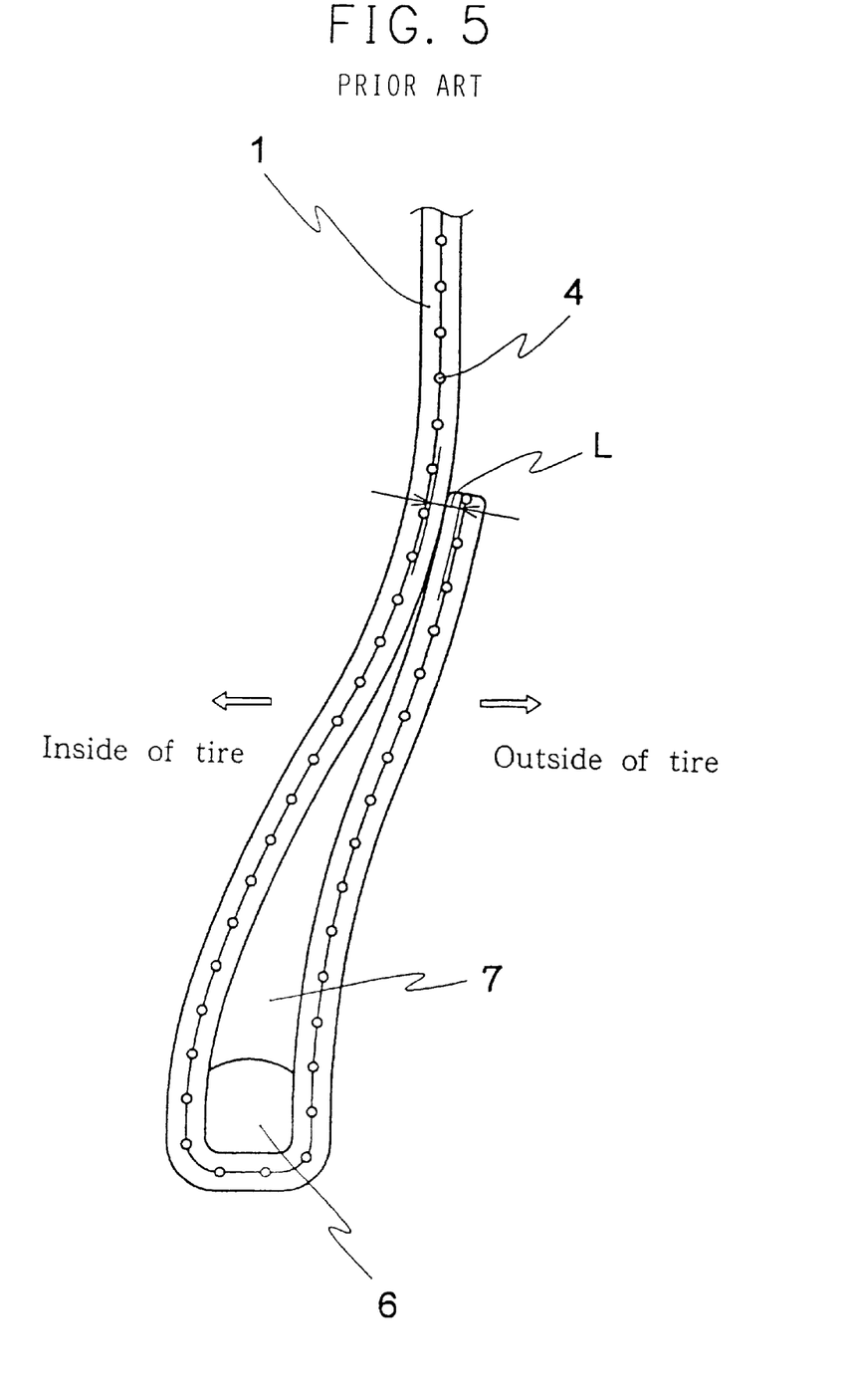
FIG. 5 is a schematic cross-sectional view of a rolled-up end portion around a bead portion in a conventional pneumatic tubeless tire.

FIG. 5 shows a diagramatical view of around the rolled-up end portion of the bead portion of a conventional pneumatic tubeless tire. In FIG. 5, numeral 1 represents the topping rubber layer, numeral 4 represents the casecords, numeral 6 represents the bead, numeral 7 represents a bead apex, L represents the distance between the aligned casecords in the rolled-up topping rubber layer and the aligned casecords in the remaining topping rubber layer after vulcanization. The rolled-up end portion is produced by bending the carcass i.e. the topping rubber layer having the aligned casecords therein around the bead core from inside to outside of the tire axis.

In Embodiment 3, the distance L at the bead portion after vulcanization is not less than 0.1 mm, preferably 0.1 to 50 mm, more preferably 0.25 to 50 mm from the viewpoint of improving durability. Thereby, durability at the rolled-up end portion in the tire can be improved and the weight of the tire to be obtained is also decreased.

Figure 3:
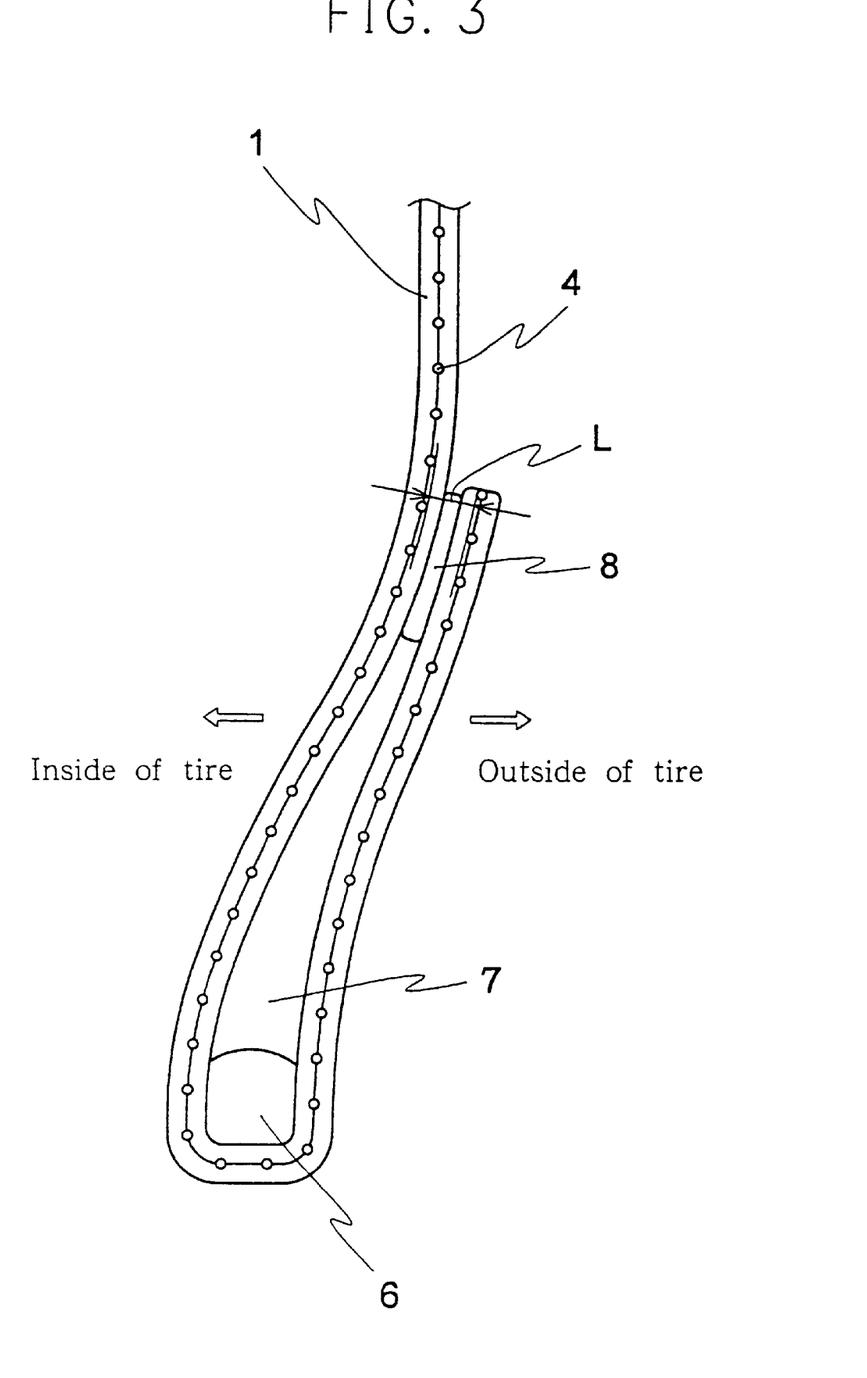
FIG. 3 is a diagramatical view of the rolled-up end portion around the bead portion in Embodiments 2 and 4, into which the rubber sheet is inserted.

In Embodiment 3, as shown in FIG. 3, a rubber sheet 8 is inserted between the carcasses (topping rubber layers) at the rolled-up end portion to adjust the distance L between the aligned casecords at the rolled-up end portion within the above-mentioned range. This is because when the thickness of the topping rubber layer itself is increased for increasing the distance L between the aligned casecords at the rolled-up end portion, the result is that the weight of the tire is also increased. For this reason the thickness of the contact portion is increased with the rubber sheet 8.

Accordingly, in the present invention, the thickness of the topping rubber layer before vulcanization is adjusted within 1 to 2 mm, preferably 1.1 to 1.6 mm and the thickness of the rubber sheet to be inserted is optionally determined so that the distance L between the aligned casecords at the rolled-up end portion is within the above-mentioned range after vulcanization.

A rubber composition constituting the rubber sheet 8 (hereinafter, referred to as "rubber composition D") may be a diene rubber composition, and is peferably the rubber composition constituting the topping rubber layer from the viewpoint of the same hardness. The size of the rubber sheet can be optionally determined according to the structure of the desired tire.

As a method for inserting the rubber sheet between the carcasses at the rolled-up end portion, the rubber sheet may be stuck during the tire molding process or previously assembled (stuck on) on the ends of the carcass (topped fabric).

Also, in order to control the distance L, the size of the bead apex may be adjusted or the width of the rolled-up portion may be decreased. The bead apex may also be a conventional one.

According to Embodiment 3, the topping rubber layer itself is endowed with good low air permeability and with sufficient adhesion to other tire members containing a diene rubber as a main component such as tread rubber or a sidewall and the casecords. Thereby, a lightweight pneumatic tubeless tire without innerliner having good durability can be obtained.

Embodiment 4 of the present invention is explained as follows.

The topping rubber layer may be produced, as explained in the above-mentioned Embodiment 2, by putting the casecords between two rubber sheets which comprise a rubber composition constituting the topping rubber layer, and extruding them (topping) through rolls. Therefore, the obtained topping rubber layer comprises two rubber layers, the inner rubber layer and the outer rubber layer. Embodiment 4 relates to a pneumatic tubeless tire without innerliner wherein the inner rubber layer comprises the above-mentioned rubber composition C.

In Embodiment 4, in the topping rubber layer comprising two layers as shown in FIG. 1, the rubber composition C is employed for endowing the inner rubber layer with good low air permeability and adhesion to the casecords.

In that case, the rubber composition constituting the outer rubber layer (hereinafter referred to as "rubber composition E") has good adhesion to the rubber composition C constituting the inner rubber layer, to the casecords and other tire members (for example, sidewall portion) containing a diene rubber as a main component.

Therefore, the rubber composition E may have the same components as the rubber composition C and, may contain a smaller amount of the brominated isobutylene/p-methylstyrene copolymer than the rubber composition C. The rubber composition E may be the same as the rubber composition B of Embodiment 2.

It is noted that when producing a tire by employing this two layered topping rubber layer, the outside rubber layer over bead portion (FIG. 2) can be provided in the same manner as in Embodiment 2.

Further, in Embodiment 4, the distance L between the aligned casecords at the rolled-up end portion is preferably adjusted within the same range and in the same manner as in Embodiment 3.

According to Embodiment 4, the inner rubber layer can be endowed with good low air permeability. And, thereby, a lightweight pneumatic tubeless tire without an innerliner having good durability can be obtained.

In the following, the present invention is explained by referring Examples, but is not limited thereto.

Preparation Examples 1 to 8

The rubber composition A for the topping rubber layer or the inner rubber layer, each of the rubber compositions A-1 to A-8 comprises the blending ratio shown in Table 1, which was prepared by kneading the rubber components and carbon black with a banbary mixer, adding sulfur, NS, zinc oxide, and stearic acid thereto and then kneading with rolls.

NR was employed as the diene rubber. EXXPRO 90-10 (referred to as "Polymer 1" in Tables) (isobutylene content: 92.5%) available from EXXON CHEMICAL COMPANY was employed as brominated isobutylene/p-methylstyrene copolymer. DIABLACK H available from Mitsubishi Chemical Corporation was employed as N330 carbon black of HAF class. Marucalets T100A (petroleum hydrocarbon resin) available from Maruzen Petrochemical Co., Ltd. was employed as tackifier. Also, added to the all of the rubber compositions were 2 parts of stearic acid, 3.75 parts of insoluble sulfur (M95 available from Nippon Kanryu Kabushiki Kaisha), 1 part of N-tert-butyl-2-benzothiazolylsulfenamide(NS) and 5 parts of zinc white.

The obtained rubber compositions A were evaluated according to the following methods.

Evaluating Methods

① Evaluation of air permeability

For evaluating air permeability of each of the vulcanized rubber compositions A-1 to A-8 obtained by vulcanizing the rubber compositions A-1 to A-8 under 9.8 MPa (100 kgf/cm$^2$) at 170° C. for 12 minutes, an air permeability coefficient was measured according to the testing method of ASTM D-1434-75M with Gas Permeability Measuring Machine available from TOYO SEIKI SEISAKU-SHO, LTD. The evaluation is represented as index by assuming the coefficient obtained in the following Comparative Example 1 to be 100. The lower the value is, the lower the air permeability. The results are shown in Table 1.

② Evaluation of adhesion of the rubber composition A to the casecords.

The rubber sheets A-1 to A-8 including textile cords (topping rubber layer) were prepared by topping the casecords of about 48 polyester fibers (1670 dtex/2 (diameter 0.66 mm)) per 5 cm with the rubber composition A-1 to A-8 as the rubber composition A for the topping rubber layer. Thus, two same rubber sheets were laminated on each other so that the cords in the rubber sheets were oriented at a right angle and a mylar film was inserted between the two sheets, followed by vulcanizing at 150° C. for 30 minutes under a pressure of 9.8 MPa to adhere the sheets to each other. With respect to each sample, the peeling test was carried out at a peeling rate of 50 mm/min by means of Tensile Testing Machine to measure adhesion (peel) strength (N/25 mm). The results are shown in Table 1 as Adhesion Property 1. There is no problem in the tires if the value is not less than 300 N/25 mm.

③ Evaluation of adhesion of the rubber composition A to the rubber composition for sidewall (SW).

The rubber sheets A-1 to A-8 were prepared by extruding the rubber compositions A-1 to A-8 for the topping rubber layer into sheets having a thickness of 2 mm and, then, cutting them into the size of 2 mm thickness, 80 mm width, and 150 mm length.

The rubber composition for other tire members (sidewall) contains a diene rubber as a main component, the rubber composition for SW comprising 40 parts of NR, 60 parts of butadiene rubber, 60 parts of carbon black (Shiisto SO available from TOKAI CARBON CO., LTD.: FEF), 2 parts of stearic acid, 2.5 parts of zinc white and 1 part of sulfur was prepared in the same manner as in the rubber composition A, and the rubber sheet for SW was produced therefrom in the same manner as in the the rubber sheet A. Then, the rubber sheet A and the SW rubber sheet were adhered to each other by vulcanizing them under a pressure of 2 MPa at 170° C. for 12 minutes. An adhesion strength (kgf/25 mm) of the obtained sample was measured in the same manner as above. The results are shown in Table 1 as Adhesion Property 2. There arises no problem if the value is not less than 50 kgf/25 mm. Further, the value is preferably not less than 100 kgf/25 mm.

④ Evaluation of adhesion among the inner rubber layer, the outer rubber layer and the casecords The rubber sheet for the outer rubber layer (referred to as "outer rubber sheet") comprising the following components (referred to as "outer rubber composition") was prepared in the same manner as in the rubber sheet A.

| | |
|---|---|
| NR | 70 parts |
| SBR (available from Japan Synthetic Rubber Co., Ltd.) | 30 parts |
| Carbon black (HAF N330) | 45 parts |
| Plasticizer (mineral oil) | 10 parts |
| Stearic acid | 2 parts |
| Zinc white | 5 parts |
| Insoluble sulfur | 3.75 parts |
| NS | 1 part |

The rubber sheets (for topping rubber layer) A-1 to A-8 were produced by putting the casecords of about 48 polyester fibers (1670 dtex/2 (diameter: 0.66 mm)) per 5 cm between one of the rubber sheets A-1 to A-8 for the inner rubber layer and the outer rubber sheet, and the topping. Two same rubber sheets thus obtained were laminated on each other so that cords in the rubber sheets were oriented at a right angle, and the outer layer and the inner layer were contacted with each other. After a mylar film was inserted between the two sheets, the two sheets were adhered to each other by vulcanizing at 150° C. for 30 minutes under 9.8 MPa With respect to each sample, the peeling test was carried out at a peeling rate of 50 mm/min by means of Tensile Testing Machine to measure adhesion (peel) strength (N/25 mm). The results are shown in Table 1 as Adhesion Property 3. It is preferable that the strength is higher. There arises no problem if the value is not less than 300 N/25 mm.

④ Evaluation of moisture permeability

By employing the rubber sheet A, moisture permeability of the rubber was measured according to the Cup method of JIS Z 0208 and converted into the value per 1 mm and represented as an index by assuming the value obtained in Comparative Example 1 to be 100. The results are shown in Table 1. When the value is lower, advantages an that moisture permeability is low and that the separation between the breakers caused by hydrolysis of the casecord and degradation of the topping rubber from moisture inside of tire permeating to outside of tire can be prevented.

TABLE 1

| | Preparation Example | | | | | | | |
|---|---|---|---|---|---|---|---|---|
| | 1 | 2 | 3 | 4 | 5 | 6 | 7 | 8 |
| Rubber Composition | A-1 | A-2 | A-3 | A-4 | A-5 | A-6 | A-7 | A-8 |
| NR (parts by weight) | 50 | 60 | 65 | 70 | 75 | 80 | 90 | 50 |
| Polymer 1 (parts by weight) | 50 | 40 | 35 | 30 | 25 | 20 | 10 | 50 |
| Carbon black (parts by weight) | 45 | 45 | 45 | 45 | 45 | 45 | 45 | 45 |
| Tackifier (parts by weight) | 5 | 5 | 5 | 5 | 5 | 5 | 5 | 10 |
| Air permeability coefficient (cc · cm/cm$^2$ · sec · cm · Hg) | 13 | 17 | 18.5 | 20.4 | 23 | 25 | 32 | 12 |
| Adhesion property 1 (N/25 mm) | 300.4 | 302.5 | 303.1 | 308.4 | 308.5 | 309.4 | 315.3 | 300.0 |

TABLE 1-continued

|  | Preparation Example | | | | | | | |
|---|---|---|---|---|---|---|---|---|
|  | 1 | 2 | 3 | 4 | 5 | 6 | 7 | 8 |
| Rubber Composition | A-1 | A-2 | A-3 | A-4 | A-5 | A-6 | A-7 | A-8 |
| Adhesion property 2 (kgf/25 mm) | 55 | 78.4 | 87.5 | 95.8 | 102.4 | 124.5 | 132.1 | 54 |
| Adhesion property 3 (N/25 mm) | 302.4 | 310.2 | 312.5 | 323.8 | 308.2 | 324.4 | 331.8 | 300.2 |
| Moisture permeability | 30 | 35 | 38 | 44 | 51 | 62 | 75 | 29 |

Comparative Preparation Examples 1 to 14

The comparative rubber composition A (A-1c to A-14c) and the comparative rubber sheet A (A-1c to A-14c) were prepared in the same manner as in the rubber composition A and the rubber sheet A, respectively, and then the evaluations ① to ④ were carried out. The results are shown in Table 2.

It is noted that Br-IIR 2255 (bromobutyl rubber) was used as Polymer 2 and a mineral oil available from JAPAN ENERGY CORPORATION was used as a plasticizer in Table 2.

topping rubber layer and a tubeless tire (Comparative Tire T-1c) was produced in the same manner as in Example 1 except that an innerliner was provided according to a conventional manner.

COMPARATIVE EXAMPLES 2 to 7

Tubeless tires (Comparative Tires) T-2c to T-7c were produced in the same manner as in Example 1 except that the comparative rubber compositions A-1c, A-2c, A-6c, A-11c, A-13c and A-14c were employed as the rubber composition for the topping rubber layer.

TABLE 2

|  | Comparative Preparation Example | | | | | | | | | | | | | |
|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 |
| Comparative Rubber Composition | A-1c | A-2c | A-3c | A-4c | A-5c | A-6c | A-7c | A-8c | A-9c | A-10c | A-11c | A-12c | A-13c | A-14c |
| NR (parts by weight) | 40 | 100 | 60 | 50 | 60 | 70 | 80 | 90 | 100 | 50 | 50 | 50 | 50 | 50 |
| Polymer 1 (parts by weight) | 60 | — | — | — | — | — | — | — | — | 50 | 50 | 50 | 50 | 50 |
| Polymer 2 (parts by weight) | — | — | 40 | 50 | 40 | 60 | 20 | 10 | — | — | — | — | — | — |
| Carbon black (parts by weight) | 45 | 45 | 45 | 45 | 45 | 45 | 45 | 45 | 45 | 45 | 45 | 45 | 45 | 45 |
| Tackifier (parts by weight) | 5 | 5 | 5 | 5 | 5 | 5 | 5 | 8 | — | — | 5 | 10 | 15 |
| Plasticizer (parts by weight) | — | — | — | — | — | — | — | — | — | 5 | 10 | 5 | 5 | — |
| Air permeability coefficient (cc · cm/cm² · sec · cm · Hg) | 10 | 40 | 10.2 | 14 | 17 | 20.5 | 24.5 | 33 | 40 | 18 | 23.5 | 16.5 | 15.8 | 12 |
| Adhesion property 1 (N/25 mm) | 238.7 | 328 | 238 | 234.6 | 246.3 | 262.1 | 272.1 | 284.5 | 324.1 | 284.1 | 262.1 | 276.2 | 253.8 | 280.7 |
| Adhesion property 2 (kgf/25 mm) | 32 | 100 | 32 | 55 | 78.4 | 100 | 100 | 100 | 100 | 48 | 42 | 55 | 48 | 44 |
| Adhesion property 3 (N/25 mm) | 245.3 | 335 | 245.3 | 252.3 | 264.3 | 278.8 | 286.4 | 296.7 | 335 | 289.4 | 276.3 | 283.4 | 265.3 | 286.3 |
| Moisture permeability | 23 | 90 | 21 | 28 | 34.5 | 42 | 59 | 71 | 90 | 36 | 42 | 35 | 24 | 28.5 |

From the results shown in Tables 1 and 2, all of the performances such as air permeability, moisture permeability and adhesion property can be satisfied only when the blending ratio of NR to the brominated isobutylene/p-methylstyrene is 50 to 90 parts/50 to 10 parts, no plasticizer is introduced, and the tackifier is contained in an amount of 5 to 10 parts. Namely, in the case of using only brominated butyl rubber, the adhesion to cords is not sufficient. Also, if a plasticizer is added, the air permeability increases and the adhesion strength decreases.

EXAMPLES 1 to 4

Embodiment 1

A mixture of the rubber compositions A-1, A-4, A-7 and A-8 were employed as the rubber composition A constituting the topping rubber layer in Embodiment 1 and the tubeless tires without innerliner (Tires T-1 to T-4) of the present invention having the size of 205/65R15 were produced according a conventional manner.

COMPARATIVE EXAMPLE 1

The outer rubber composition used in the above-mentioned evaluation ④ as the rubber composition for the EXAMPLES 5 to 8

Embodiment 2

The tubeless tires without innerliner (Tires T-5 to 8) of the present invention having the same size as of Tire T-1 were produced according to a conventional manner except that the rubber compositions A-1, A-4, A-7 and A-8 were employed as the rubber composition for the inner rubber layer and that the outer rubber composition used in the above-mentioned evaluation ④ was employed as the rubber composition for the outer rubber layer according to Embodiment 2.

The weight of each of Tires T-1 to T-8 and Comparative Tires T-1c to T-7c was measured and, rolling resistance, air permeability (leak of air) and durability were measured according to the following methods. The results are shown in Table 3.

It is noted that the gauge under cord means the thickness of the rubber provided on the inside from the aligned casecords below the tread crown area of tire. In Comparative Example 1, the gauge under cord means the total thickness of the topping rubber layer provided on the inside from the aligned casecords and the innerliner and, in other Comparative Examples and Examples, means the thickness of the topping rubber layer provided on the inside from the aligned casecords.

Evaluating Methods

⑥ Rolling resistance

The rolling resistance was measured by Drum Testing Machine under the conditions of 80 km/h and a load of 400 kgf and represented as index by assuming the value obtained in Comparative Tire T-1c to be 100. The smaller the value is, the smaller the rolling resistance.

⑦ Air permeability (leak of air)

Each of the obtained tires was assembled with a rim and the inner pressure was set to 3 kgf/cm$^2$. Then, the reduction of the inner pressure after three months was measured and represented as index by assuming the value of Comparative Tire T-1c to be 100. The higher the value is, the lower the air permeability.

⑧ Durability 1

Each of the obtained tires was assembled with a rim, and durability was tested with a drum in a room under the condition of a running speed of 80 km/h, an innner pressure of 190 kPa and a load of 646 kg. After the mileage of 20,000 km, when no extraordinary change was observed, the durability was evaluated as ◯, and when extraordinary change was observed, the durability was evaluated as ×, and the mileage when the change occurs is noted.

The amounts of the additives in every rubber composition were 45 parts of carbon black, 5 parts of tackifier, 2 parts of stearic acid, 3.75 parts of insoluble sulfur, 1 part of NS and 5 parts of zinc white. The same evaluations as in Preparation Example 1 were carried out. The results are shown in Table 4.

It is noted that the above-mentioned Polymer 1 and Polymer 2 were employed as polymers, Antigen FR (reaction product of amine and ketone) available from Sumitomo Chemical Co., Ltd. was employed as Antioxidant 1, Nocrack AW (6-ethoxy-1,2-dihydro-2,2,4-trimethylquinoline) available from Ouchi Shinko Kagaku Kogyo Kabushiki Kaisha was employed as Antioxidant 2, Nocrack B (reaction product of diphenylamine and acetone) available from Ouchi Shinko Kagaku Kogyo Kabushiki Kaisha was employed as Antioxidant 3, and Nocrack 6C(N-phenyl-N-(1,3-dimethylbutyl)-p-phenyleneamine) available from Ouchi SHinko Kagaku Kogyo Kabushiki Kaisha was employed as Antioxidant 4. Antioxidants 1 to 3 are the amine-ketone antioxidants.

TABLE 3

| | Example | | | | | | | | Comparative Example | | | | | | |
|---|---|---|---|---|---|---|---|---|---|---|---|---|---|---|---|
| Tire | 1 T-1 | 2 T-2 | 3 T-3 | 4 T-4 | 5 T-5 | 6 T-6 | 7 T-7 | 8 T-8 | 1 T-1c | 2 T-2c | 3 T-3c | 4 T-4c | 5 T-5c | 6 T-6c | 7 T-7c |
| Weight of tire (kgf) | 92 | 92 | 95 | 92 | 92 | 92 | 95 | 92 | 100 | 92 | 92 | 92 | 92 | 92 | 92 |
| Rolling resistance | 96 | 95 | 95 | 97 | 95 | 94 | 94 | 96 | 100 | 98 | 93 | 98 | 97 | 99 | 99 |
| Air permeability | 110 | 101 | 100 | 112 | 110 | 101 | 100 | 112 | 100 | 112 | 85 | 103 | 99 | 104 | 111 |
| Durability 1 | ◯ | ◯ | ◯ | ◯ | ◯ | ◯ | ◯ | ◯ | ◯ | X (4000 km) | ◯ | X (10000 km) | X (2000 km) | X (4000 km) | X (10000 km) |
| Guage under cord (mm) | 0.5 | 0.5 | 0.75 | 0.5 | 0.5 | 0.5 | 0.75 | 0.5 | 1 | 0.5 | 0.5 | 0.5 | 0.5 | 0.5 | 0.5 |

PREPARATION EXAMPLES 9 to 15

As the rubber composition C for the topping rubber layer or the inner rubber layer, the rubber compositions C-1 to C-7 having the blending ratio shown in Table 4 were prepared by kneading the rubber components, carbon black, stearic acid and amine-ketone antioxidant with a banbury mixer, adding sulfur, N-tert-butyl-2-benzothiazolylsulfenamide(NS) and zinc white thereto, and kneading them with rolls.

COMPARATIVE PREPARATION EXAMPLES 15 to 18

The comparative rubber compositions C-1c to C-4c were prepared in the same manner as in Preparation Example 9 except that the blending ratios shown in Table 4 were employed. With respect to the obtained comparative rubber compositions C-1c to C-4c, the same evaluations as in Preparation Example 1 were carried out. The results are shown in Table 4.

TABLE 4

| | Preparation Example | | | | | | | Comparative Preparation Example | | | |
|---|---|---|---|---|---|---|---|---|---|---|---|
| Rubber Composition | 9 C-1 | 10 C-2 | 11 C-3 | 12 C-4 | 13 C-5 | 14 C-6 | 15 C-7 | 15 C-1c | 16 C-2c | 17 C-3c | 18 C-4c |
| NR (parts by weight) | 50 | 60 | 70 | 80 | 90 | 70 | 70 | 40 | 100 | 70 | 70 |
| Polymer 1 (parts by weight) | 50 | 40 | 30 | 20 | 10 | 30 | 30 | 60 | — | 30 | 30 |
| Antioxidant 1 (parts by weight) | 2 | 2 | 2 | 2 | 2 | — | — | 2 | 2 | — | — |
| Antioxidant 2 (parts by weight) | — | — | — | — | — | 2 | — | — | — | — | — |
| Antioxidant 3 (parts by weight) | — | — | — | — | — | — | 2 | — | — | — | — |

TABLE 4-continued

| | Preparation Example | | | | | | | Comparative Preparation Example | | | |
|---|---|---|---|---|---|---|---|---|---|---|---|
| Rubber Composition | 9<br>C-1 | 10<br>C-2 | 11<br>C-3 | 12<br>C-4 | 13<br>C-5 | 14<br>C-6 | 15<br>C-7 | 15<br>C-1c | 16<br>C-2c | 17<br>C-3c | 18<br>C-4c |
| Antioxidant 4 (parts by weight) | — | — | — | — | — | — | — | — | — | — | 2 |
| Air permeability coefficient (cc · cm/cm$^2$ · sec · cm · Hg) | 13 | 17 | 20.4 | 35 | 32 | 20.3 | 20.4 | 10 | 40 | 20.3 | 20.4 |
| Adhesion property 1 (N/25 mm) | 300.4 | 302.5 | 308.4 | 309.4 | 315.3 | 309.4 | 310.2 | 238.7 | 328.0 | 309.4 | 301.0 |
| Adhesion property 2 (kgf/25 mm) | 55 | 78.4 | 95.8 | 124.5 | 132.1 | 96.3 | 97.8 | 32 | 152.3 | 96.3 | 94.6 |
| Adhesion property 3 (N/25 mm) | 302.4 | 310.2 | 323.8 | 324.4 | 331.8 | 319.4 | 324.3 | 245.3 | 335.6 | 319.4 | 312.4 |
| Moisture permeability | 30 | 35 | 44 | 62 | 75 | 44 | 43 | 23 | 101 | 44 | 44 |

PREPARATION EXAMPLES 16 to 22

The rubber compositions C-9 to C-14 and the rubber sheets C-9 to C-14 were prepared in the same manner as in Preparation Example 9 except that NR and Polymer 2 (bromobutyl rubber) were used as the rubber component and that the blending ratios shown in Table 5 were employed. With respect to the obtained rubber compositions C-9 to C-14, the evaluations ① to ⑤ were carried out. The results are shown in Table 5.

COMPARATIVE PREPARATION EXAMPLES 19 to 22

The comparative rubber compositions C-5c to C-8c and the comparative rubber sheets C-5c to C-8c were prepared in the same manner as in Preparation Example 9 except that the blending ratios shown in Table 5 were employed. The above-mentioned evaluations ① to ⑤ were carried out. The results are shown in Table 5.

From the results shown in Tables 4 and 5, it is found that only when the blending ratio of NR/butyl rubber is 50/50 to 90/10, the performances of the rubber sheets are preferable, namely, an air permeability coefficient being not more than 35XE-11, Adhesion Properties 1 and 2 being not less than 300 N/25 mm, and Adhesion Property 3. being not less than 50 kgf/25 mm Further, since the butyl rubber is employed, the rubber composition preferably has a lower air-permeablity coefficient and a lower moisture permeability.

EXAMPLES 9 to 11

Embodiment 3

The rubber compositions C-1, C-3 and C-5 were employed as the rubber composition C for the topping rubber layer in Embodiment 3, and the tubeless tires without innerliner (Tires T-9 to T-11) of the present invention having a size of 205/65R15 were produced according to a conventional manner except that an innerliner was not provided.

In that case, the thickness (before vulcanization, hereinafter the same) of the gauge under cord and the thickness (before vulcanization, hereinafter the same) of the topping rubber layer were adjusted to the thicknesses shown in Table 6. The distance L (after vulcanization, hereinafter the same) between that alinged casecords at the rolled-up end portion was adjusted. to 0.3 mm by inserting the inserting rubber sheet having a size of 0.5 mm in thickness and 2 cm in width, which was prepared from the outer rubber composition used in the above-mentioned evaluation ④.

It is noted that the gauge under cord means the thickness of the rubber provided on the inside from the aligned casecords under the tread crown of tire.

TABLE 5

| | Preparation Example | | | | | | | Comparative Preparation Example | | | |
|---|---|---|---|---|---|---|---|---|---|---|---|
| Rubber Composition | 16<br>C-8 | 17<br>C-9 | 18<br>C-10 | 19<br>C-11 | 20<br>C-12 | 21<br>C-13 | 22<br>C-14 | 19<br>C-5c | 20<br>C-6c | 21<br>C-7c | 22<br>C-8c |
| NR (parts by weight) | 50 | 60 | 70 | 80 | 90 | 70 | 70 | 40 | 100 | 70 | 70 |
| Polymer 2 (parts by weight) | 50 | 40 | 30 | 20 | 10 | 30 | 30 | 60 | — | 30 | 30 |
| Antioxidant 1 (parts by weight) | 2 | 2 | 2 | 2 | 2 | — | — | 2 | 2 | — | — |
| Antioxidant 2 (parts by weight) | — | — | — | — | — | 2 | — | — | — | — | — |
| Antioxidant 3 (parts by weight) | — | — | — | — | — | — | 2 | — | — | — | — |
| Antioxidant 4 (parts by weight) | — | — | — | — | — | — | — | — | — | — | 2 |
| Air permeability coefficient (cc · cm/cm$^2$ · sec · cm · Hg) | 11 | 17 | 20.1 | 24.6 | 32 | 20.31 | 20.1 | 9 | 40 | 20.6 | 20.4 |
| Adhesion property 1 (N/25 mm) | 300.2 | 301.7 | 306.9 | 308.3 | 315.2 | 308.7 | 309.8 | 236.7 | 328.0 | 306.4 | 300.2 |
| Adhesion property 2 (kgf/25 mm) | 52 | 78.37 | 93.4 | 126.7 | 131.1 | 94.9 | 95.2 | 32 | 152.3 | 93.5 | 94.3 |
| Adhesion property 3 (N/25 mm) | 302.4 | 310.2 | 323.8 | 324.4 | 331.8 | 316.3 | 324.1 | 245.3 | 335.6 | 315.3 | 311.2 |
| Moisture permeability | 29 | 35 | 43 | 62 | 75 | 43 | 41 | 22 | 101 | 44 | 42 |

EXAMPLES 12 to 14

Embodiment 4

The tubeless tires without innerliner (Tires T-12 to T-14) of the present invention were produced in the same manner as in Example 9 except that the rubber compositions C-1, C-3 and C-5 were employed as the rubber composition C for the inner rubber layer in Embodiment 4, and that the outer rubber composition used in the above-mentioned evaluation ④ was employed as the rubber composition for the outer rubber layer.

The resulting thickness of the gauge under cord, the thickness of the topping rubber layer and the distance L at the rolled-up end portion are shown in Table 6.

EXAMPLES 15 to 19

Embodiment 4

The tubeless tires without innerliner (Tires T-15 to T-19) of the present invention were produced in the same manner as in Example 12 except that the rubber compositions C-1, C-3, C-5, C-6 and C-7 were employed as the rubber composition C for the inner rubber layer in Embodiment 4, that the thickness of the gauge under cord and the thickness of the topping rubber layer were adjusted as shown in Table 6, and that the distance L at the rolled-up end portion was adjusted to 5 mm by shortening the width of the case and controlling it so that the height of the rolled-up end portion is positioned under the upper end of the bead apex.

The weight of each of the obtained Tires T-9 to T-19 was measured and the same evaluations as in Example 1 were carried out. The results are shown in Table 6. It is noted that the weight of the tire is represented as index by assuming the weight of Comparative Tire T-8c to be 100. The lower the value is, the lighter the weight.

During normal driving, it is enough that durability can be evaluated by the above-mentioned Durability 1. When considering recent improvement in abrasion resistance of tire and recycle (retread), however, it is necessary for the tire to tolerate more mileage. Then, Tires T-9 to T-11 which safely fifnished the test of Durability 1 were subjected to further testing of durability (Durability 2) with a drum in the same conditions as the test of Durability 1. When completed additional 40,000 km mileage, the tire was evaluated as ○, and when extraordinary change was occurred during the test, the tire was evaluated as x. The mileage when the change occurred is also noted.

COMPARATIVE EXAMPLE 8

As Comparative Tire T-8c, a commercially available tubeless tire of 205/65 R15 SP 65i from Sumitomo Rubber Industries, Ltd. was employed. Comparative Tire T-8c has the same structure as of Embodiment 3 except that the outer rubber composition used in the above-mentioned evaluation ④ was used as the rubber composition for the topping rubber layer and an innerliner was provided. With respect to Comparative Tire T-8c, the thickness of the gauge under cord, the thickness of the topping rubber layer, the distance L between the aligned casecords and Eithe results of the evaluations are shown in Table 6.

COMPARATIVE EXAMPLES 9 to 10

The tubeless tires (Comparative Tires T-9c to T-10c) were produced in the same manner as in Example 9 except that the comparative rubber compositions C-1c and C-2c were used as the rubber composition for the topping rubber layer. With respect to Comparative Tires T-9c to T-10c, the thickness of the gauge under cord, the thickness of the topping rubber layer, the distance L between the aligned casecords and the results of the evaluations are shown in Table 6.

COMPARATIVE EXAMPLES 11 to 13

The tubeless tires (Comparative Tires T-11c to T-13c) having the same structure as of Embodiment 4 were produced in the same manner as in Example 12 except that the rubber compositions C-1, C-3 and C-5 were used as the rubber composition for the inner rubber layer, that the thickness of the topping rubber layer was adjusted as shown in Table 6, and that the distance L between the aligned casecords after vulcanization was adjusted to 0.05 mm. With respect to Comparative Tires T-11c to T-13c, the thickness of the gauge under cord, the thickness of the topping rubber layer, the distance L between the aligned casecords and the results of the evaluations are shown in Table 6.

COMPARATIVE EXAMPLES 14 to 15

The Comparative Tires T-14c and T-15c were produced in the same manner as in Comparative Example 11 by employing the comparative rubber compositions C-3c and C-4c for the inner rubber layer. The thickness of the gauge under cord, the thickness of the topping rubber layer, the distance L between the alinged casecords and the results of the evaluations are shown in Table 6.

TABLE 6

| | Example | | | | | | | | | | |
|---|---|---|---|---|---|---|---|---|---|---|---|
| Tire | 9<br>T-9 | 10<br>T-10 | 11<br>T-11 | 12<br>T-12 | 13<br>T-13 | 14<br>T-14 | 15<br>T-15 | 16<br>T-16 | 17<br>T-17 | 18<br>T-18 | 19<br>T-19 |
| Rubber composition C | C-1 | C-3 | C-5 | C-1 | C-3 | C-8 | C-1 | C-3 | C-5 | C-6 | C-7 |
| Embodiment | 3 | 3 | 3 | 4 | 4 | 4 | 4 | 4 | 4 | 4 | 4 |
| Weight of tire | 92 | 92 | 95 | 92 | 92 | 95 | 91 | 91 | 94 | 92 | 92 |
| Rolling resistance | 96 | 95 | 95 | 95 | 94 | 94 | 96 | 95 | 95 | 94 | 94 |
| Air permeability | 110 | 101 | 100 | 110 | 101 | 100 | 110 | 101 | 100 | 102 | 101 |
| Durability 1 | ○ | ○ | ○ | ○ | ○ | ○ | ○ | ○ | ○ | ○ | ○ |
| Durability 2 | ○ | ○ | ○ | ○ | ○ | ○ | ○ | ○ | ○ | ○ | ○ |
| Distance L (mm) | 0.3 | 0.3 | 0.3 | 0.3 | 0.3 | 0.3 | 5 | 5 | 5 | 0.3 | 0.3 |
| Thickness of the topping rubber layer | 1.5 | 1.5 | 1.8 | 1.5 | 1.5 | 1.5 | 1.5 | 1.5 | 1.8 | 1.5 | 1.5 |
| Thickness of gauge under cord | 0.5 | 0.5 | 0.75 | 0.5 | 0.5 | 0.5 | 0.5 | 0.5 | 0.75 | 0.5 | 0.5 |

| | Comparative Tire | | | | | | | |
|---|---|---|---|---|---|---|---|---|
| Tire | 8<br>T-8c | 9<br>T-9c | 10<br>T-10c | 11<br>T-11c | 12<br>T-12c | 13<br>T-13c | 14<br>T-14c | 15<br>T-15c |
| Rubber composition C | — | C-1c | C-2c | C-1 | C-3 | C-5 | C-3c | C-4c |
| Embodiment | 3 | 3 | 3 | 4 | 4 | 4 | 4 | 4 |

TABLE 6-continued

| | | | | | | | | |
|---|---|---|---|---|---|---|---|---|
| Weight of tire | 100 | 92 | 92 | 91.5 | 91.5 | 94.5 | 92 | 92 |
| Rolling resistance | 100 | 98 | 93 | 96 | 95 | 95 | 94 | 94 |
| Air permeability | 100 | 112 | 85 | 110 | 101 | 100 | 100 | 101 |
| Durability 1 | ○ | X 4000 km* | ○ | X 15000 km | ○ | ○ | ○ | ○ |
| Durability 2 | ○ | X | ○ | X | X 22000 km | X 26000 km | X 14000 km* | X 23000 km* |
| Distance L (mm) | 0.3 | 0.3 | 0.05 | 0.05 | 0.05 | 0.05 | 0.3 | 0.3 |
| Thickness of the topping rubber layer (mm) | 1.2 | 1.5 | 1.4 | 1.4 | 1.4 | 1.7 | 1.5 | 1.5 |
| Thickness of gauge under cord (mm) | 0.5 | 0.5 | 0.5 | 0.5 | 0.5 | 0.75 | 0.5 | 0.5 |

*Cracks were observed on inner surface of the tire.

EXAMPLES 20 to 22

Embodiment 3

The tubeless tires without innerliner (Tires T-20 to T-22) were produced in the same manner as in Example 9 except that the rubber compositions C-8, C-10 and C-12 were employed for the topping rubber layer. The thickness of the gauge under cord, the thickness of the topping rubber layer, the distance L at the rolled-up end portion and the results of the above-mentioned evaluations are shown in Table 7.

EXAMPLES 23 to 25

Embodiment 4

The tubeless tires without innerliner (Tires T-23 to T-25) of the present invention were produced in the same manner as in Example 12 except that the rubber compositions C-8, C-10 and C-12 were employed for the inner rubber layer and the outside rubber composition used in the evaluation ④ was employed as the rubber composition for the outer rubber layer. The thickness of the gauge under cord, the thickness of the topping rubber layer, the distance L at the rolled-up end portion and the results of the evaluations are shown in Table 7.

EXAMPLES 26 to 30

The tubeless tires without innerliner (Tires T-26 to T-30) of the present invention were produced in the same manner as in Example 15 except that the rubber compositions C-8, C-10, C-12, C-13 and C-14 were employed as the rubber composition C for the inner rubber layer. The thickness of the gauge undercord, the thickness of the topping rubber layer, the distance L at the rolled-up end portion and the results of the evaluations are shown in Table 7.

COMPARATIVE EXAMPLES 16 to 17

The tubeless tires (Comparative Tires T-16c to T-17c) were produced in the same manner as in Example 20 except that the comparative rubber compositions C-5c and C-6c were employed as the rubber composition for the topping rubber layer. With respect to Comparative Tires T-16c to T-17c, the thickness of the gauge under cord, the thickness of the topping rubber layer, the distance L at the rolled-up end portion and the results of the evaluations are shown in Table 7.

COMPARATIVE EXAMPLES 18 to 20

The tubeless tires (Comparative Tires T-18c to T-20c) having the same structure as of Embodiment 4 were produced in the same manner as in Example 23 except that the rubber compositions C-8, C-10 and C-12 were employed as the rubber composition for the inner rubber layer, the thickness of the topping rubber layer was adjusted as shown in Table 7, and that the distance L between the alinged casecords after vulcanization was adjusted to 0.05 mm. With respect to Comparative Tires T-18c to T-20c, the thickness of the gauge under cord, the thickness of the topping rubber layer, the distance L at the rolled-up end portion and the results of the evaluations are shown in Table 7.

COMPARATIVE EXAMPLES 21 to 22

The Comparative Tires T-2 1c and T-22c were produced by employing the comparative rubber compositions C-7c and C-8c as the inner rubber layer. The thickness of the gauge under cord, the thickness of the topping rubber layer, the distance L at the rolled-up end portion and the results of the evaluations are shown in Table 7.

TABLE 7

| | Example | | | | | | | | | | |
|---|---|---|---|---|---|---|---|---|---|---|---|
| | 20 | 21 | 22 | 23 | 24 | 25 | 26 | 27 | 28 | 29 | 30 |
| Tire | T-20 | T-21 | T-22 | T-23 | T-24 | T-25 | T-26 | T-27 | T-28 | G-29 | T-30 |
| Rubber composition C | C-8 | C-10 | C-12 | C-8 | C-10 | C-12 | C-8 | C-10 | C-12 | C-13 | C-14 |
| Embodiment | 3 | 3 | 3 | 4 | 4 | 4 | 4 | 4 | 4 | 4 | 4 |
| Weight of tire | 92 | 92 | 95 | 92 | 92 | 95 | 91 | 91 | 94 | 92 | 92 |
| Rolling resistance | 95 | 95 | 94 | 94 | 94 | 93 | 95 | 95 | 94 | 93 | 93 |
| Air permeability | 112 | 103 | 101 | 112 | 102 | 100 | 111 | 102 | 101 | 103 | 103 |
| Durability 1 | ○ | ○ | ○ | ○ | ○ | ○ | ○ | ○ | ○ | ○ | ○ |
| Durability 2 | ○ | ○ | ○ | ○ | ○ | ○ | ○ | ○ | ○ | ○ | ○ |
| Distance L (mm) | 0.3 | 0.3 | 0.3 | 0.3 | 0.3 | 0.3 | 5 | 5 | 5 | 0.3 | 0.3 |

TABLE 7-continued

| | | | | | | | | | | | |
|---|---|---|---|---|---|---|---|---|---|---|---|
| Thickness of the topping rubber layer (mm) | 1.5 | 1.5 | 1.8 | 1.5 | 1.5 | 1.5 | 1.5 | 1.5 | 1.8 | 1.5 | 1.5 |
| Thickness of gauge under cord (mm) | 00.5 | 0.5 | 0.75 | 0.5 | 0.5 | 0.75 | 0.5 | 0.5 | 0.75 | 0.5 | 0.5 |

| | Comparative Example | | | | | | | |
|---|---|---|---|---|---|---|---|---|
| Tire | 8<br>T-8c | 16<br>T-16c | 17<br>T-17c | 18<br>T-18c | 19<br>T-19c | 20<br>T-20c | 21<br>T-21c | 22<br>T-22c |
| Rubber composition C | — | C-5c | C-6c | 8 | 10 | 12 | C-7c | C-8c |
| Embodiment | 3 | 3 | 3 | 4 | 4 | 4 | 4 | 4 |
| Weight of tire | 100 | 92 | 92 | 91.5 | 91.5 | 94.5 | 92 | 92 |
| Rolling resistance | 100 | 98 | 92 | 95 | 95 | 94 | 93 | 93 |
| Air permeability | 100 | 114 | 86 | 112 | 102 | 101 | 103 | 103 |
| Durability 1 | ○ | X<br>3500 km* | ○ | X<br>14000 km | ○ | ○ | ○ | ○ |
| Durability 2 | ○ | X | ○ | X | X<br>22000 km | X<br>24000 km | X<br>12500 km* | X<br>21500 km* |
| Distance L | 0.3 | 0.3 | 0.05 | 0.05 | 0.05 | 0.05 | 0.3 | 0.3 |
| Thickness of the topping rubber layer (mm) | 1.2 | 1.5 | 1.4 | 1.4 | 1.4 | 1.7 | 1.5 | 1.5 |
| Thickness of gauge under cord (mm) | 0.5 | 0.5 | 0.5 | 0.5 | 0.5 | 0.75 | 0.5 | 0.5 |

*Cracks were observed on inner surface of the tire.

From Tables 6 and 7, it is clear that a lightweight tire having a low rolling resistance and a high durability can be obtained, when the blending ratio of NR/butyl rubber is 50/50 to 90/10, the distance L between the aligned casecords is not less than 0.1 mm, and the amine-ketone antioxidant is blended.

Also, cracks were generated in Comparative Tires T-9c and T-16c during the evaluation of Durability 1, and cracks were generated in Comparative Tires T-14c, T-15c, T-21c and T-22c during the evaluation of Durability 2. From the results, it is clear that the comparative rubber compositions C-1c, C-3c, C-4c, C-5c, C-7c and C-8c are inferior in resistance to bending fatigue.

According to the present invention, a lightweight tubeless tire without an innerliner that is superior in adhesion between the topping rubber layer and other tire members containing a diene rubber as a main component and also with superior durability can be obtained.

What we claim is:

1. In a pneumatic tubeless tire having no innerliner and having a topping rubber layer which includes aligned casecords therein; the improvement comprising that said topping rubber layer comprises no plasticizer and comprises 100 parts by weight of a rubber component consisting essentially of 71 to 90% by weight of a diene rubber and 29 to 10% by weight of brominated isobutylene/p-methylstyrene copolymer and 1 to 10 parts by weight of a petroleum hydrocarbon resin.

2. In a pneumatic tubeless tire having no innerliner and having a topping rubber layer which includes aligned casecords therein; the improvement comprising that said topping rubber layer comprises an inner rubber layer provided on the inside from the aligned casecords and an outer rubber layer provided on the outside form the aligned casecords, that a rubber component for said outer rubber layer comprises a natural rubber and styrene-butadiene rubber, and that a rubber composition for said inner rubber layer contains no plasticizer and comprises 100 parts by weight of a rubber component consisting essentially of 71 to 90% by weight of a diene rubber and 29 to 10% by weight of brominated isobutylene/p-methylstyrene copolymer and 1 to 10 parts by weight of a petroleum hydrocarbon resin, said rubber component for the inner rubber layer being different from said rubber component for the outer rubber layer.

3. In a pneumatic tubeless tire having no innerliner and having a topping rubber layer which includes aligned casecords in a main portion thereof, wherein an end portion of said topping rubber layer is rolled up around a bead portion and a rolled-up topping rubber layer is overlapped with the main portion of the topping rubber layer; the improvement comprising, that a rubber composition for the topping rubber layer contains an amine-ketone antioxidant but contains no plasticizer and comprises 100 parts weight of a rubber component consisting essentially of 50 to 90% by weight of a diene rubber and 50 to 10% by weight of a halogenated butyl rubber or brominated isobutylene/p-methylstyrene copolymer, and 1 to 10 parts by weight of a tackifier, and that, after vulcanization, a minimum distance between the aligned casecords in the remaining topping rubber layer and the aligned casecords in the rolled-up topping rubber layer is not less than 0.1 mm.

4. The pneumatic tubeless tire of claim 3, wherein the topping rubber layer comprises an inner rubber layer provided on the inside from the aligned casecords, and an outer rubber layer on the outside from the aligned casecords, and a rubber component for said outer rubber layer comprises a natural rubber and styrene-butadiene rubber, and the inner rubber layer contains an amine-ketone antioxidant but contains no plasticizer and comprises 100 parts by weight of a rubber component consisting essentially of 50 to 90% by weight of a diene rubber and 50 to 10% by weight of a halogenated butyl rubber or brominated isobutylene/p-methylstyrene copolymer, and 1 to 10 parts by weight of a tackifier, said rubber component for the inner rubber layer being different from said rubber component for the outer rubber layer.

* * * * *